United States Patent Office 3,079,299
Patented Feb. 26, 1963

3,079,299
SELF-PROPELLING MEDICINAL OINTMENT COMPOSITION CONTAINING POLYETHYLENE AND METHOD OF APPLICATION
Theodore Heilig, Long Beach, N.Y., assignor to General Aerosol Corporation, New York, N.Y., a corporation of New York
No Drawing. Filed Nov. 16, 1959, Ser. No. 852,929
8 Claims. (Cl. 167—58)

This invention relates to improvements in medicinal ointment compositions and more particularly to such compositions including an ointment base of mineral oil containing dispersed polyethylene resin and a volatile propellant for dispensing and applying the medicinal ointment to the part of the body to be treated.

This application is a continuation-in-part of my pending application Serial No. 618,425, filed October 26, 1956, now abandoned, for "Self-Propelling Medicinal Ointment Composition Containing Polyethylene and Method of Application."

Since the filing of the above application, certain patents have been granted and proposals made with respect to the spraying of ointment compositions, but so far as known, such compositions have not proved entirely satisfactory for various reasons. It appears that the bases employed provide an impervious seal over the affected area to which they are applied and also tend to retain the medicant or release it only very slowly to the affected area.

The primary object of the invention is to provide a self-propelling fluid medicinal ointment composition adapted to be atomized from a fluid-tight container and which, when applied directly as a fine spray or mist to the part of the body to be treated, is of such a character as to provide a breathing covering of polyethylene filaments from which the medicant is rapidly released to the treated area of the body.

A further object of the invention is to provide an aerosol medicinal ointment composition including a polyethylene base and a highly effective medicant which is readily released from the base of the composition when sprayed onto an affected area of the body.

The ointment base used in the medicinal ointment composition is preferably a polyethylene-containing gel of the type sold by Squibb under the trade name "Plastibase," made in two forms; Squibb oleaginous ointment base and Squibb absorbent ointment base. The first contains 95% liquid petrolatum U.S.P. and 5% polyethylene by weight. The second base contains 88.16% liquid petrolatum U.S.P., 5.64% polyethylene, 6% emulsifying agent, 0.1% antioxidant and 0.1% preservative to prevent mold growth after the addition of water. These percentages are by weight.

The method of making Squibb base is described in United States Patent No. 2,628,187, granted February 10, 1953, and in the Journal of the American Pharmaceutical Association, Scientific Edition, volume XLV, No. 2, February 1956, pages 102 to 105, under the title "Modern Ointment Base Technology."

The polyethylene ointment base is an ideal base because of its stability and its wide range of compatability with all commonly-prescribed dermatological and other drugs. The polyethylene base or bases are smooth homogeneous, colorless, stainless and odorless materials which do not run at body temperatures. They impart a velvety, non-greasy feel to the skin and are readily removable.

The polyethylene resin in the base is dispersed therein in the form of small crystallites surrounded by long filaments of amorphous resin. These small crystallites are close enough to each other to allow the long fibers or filaments to intermesh and produce a sponge-like structure which retains the mienral oil, the medicament and the other ingredients. These properties of the polyethylene base employed in the compositions of the present invention are greatly enhanced and other advantageous properties obtained when the base is incorporated as an ingredient in an aerosol medicinal ointment composition and applied to an affected area of the body. When the aerosol ointment composition is atomized onto the affected area of the body, the polyethylene resin provides a breathing film which permits access of air and oxygen to the affected area of the body and facilitates the rapid release of the medicant to the affected area, thereby accelerating the healing of infections, burns and other wounds. The propelling of the ointment with a liquified gaseous propellant cooperates with the structural characteristics of the polyethylene in such a way that the filaments of the polyethylene resin are interlaced in a loose dispersion over the affected area of the body to provide a breathing covering permitting the access of air and oxygen and the rapid release of the medicant to the affected area.

Ointments previously made containing the polyethylene base were applied to affected areas by spreading but without achieving the outstanding results which have been obtained by utilizing the polyethylene base and medicant in an aerosol. One of the problems solved in the making of the present invention was that of incorporating the polyethylene base in liquified gaseous propellants so that it could be used as an aerosol and sprayed. Previous attempts to compound the polyethylene base with such propellants in order to produce a self-propelling composition, so far as known, were not successful until the making of the present invention.

In general, the improved self-propelling fluid medicinal ointment composition according to the invention comprises a medicament in an effective proportion for the purpose, an ointment base and a volatile propellant, the ointment base being composed of a mineral oil having a desired viscosity containing a dispersion of polyethylene having a molecular weight of at least 3,500, the polyethylene being present in an amount equal to approximately 0.25% to 50% of the combined weight of the mineral oil and polyethylene. In this composition the volatile propellant is a liquified compressed gas provided in sufficient proportion in the ointment composition to atomize it through the valve of the container in which it is stored under pressure, and to produce a uniform porous coating of the polyethylene ointment base with the medicament dispersed therein.

The composition includes at least one primary medicant, for a particular purpose or purposes, for example for healing burns, infections or for other specific purposes. The ointment composition advantageously also includes other medicants, such as a pain-killing agent, an antibiotic, and a germicide in effective proportions for these particular purposes. The antibiotic may be the primary medicant.

The primary medicant included in the ointment composition according to the invention preferably comprises an antiseptic, bactericidal or antibiotic medicant particularly useful in topical applications. Examples of such medicants are merthiolate, an antiseptic, tyrothricin, an antibiotic, thiomerosal, an antiseptic, neomycin, a powerful bactericidal and antibiotic medicant, neomycin sulphate and active neomycin salts of organic acids, particularly the caprylate, the propionate and the undecylenate. These active organic salts of neomycin, in addition to being active like neomycin, also have a fungicitic action. These active organic salts of neomycin are stable, adhere to skin lesions and will remain for days, therefore providing desirable characteristics useful for topical application. The preferred medicant according to the invention is neomycin undecylenate, the physical and medicinal characteristics of which provide many desirable and unusual features useful for topical application. When neomycin undecylenate is combined with the polyethylene ointment base in an aerosol composition, it has been found to be unusually effective for various topical applications, as described more in detail hereinafter.

Illustrative embodiments of self-propelling ointment compositions according to the invention are given in the following examples in which the percentages are by weight.

*Example 1*

|  | Percent |
|---|---|
| Merthiolate | 0.001 |
| Dichlorophene | 0.100 |
| Tyrothricin | 0.075 |
| Oleaginous ointment base (including 2.5% benzocaine) | 29.824 |
| Inert volatile propellant | 70.000 |

This is a burn spray aerosol ointment in which the benzocaine is included as a pain-killing agent, merthiolate as an antiseptic, tyrothricin as an antibiotic and dichlorophene as a germicide. The percentages of these last three ingredients may differ somewhat according to different prescriptions but they are present in an effective, sufficient quantity (q.s.) for the purpose.

The inert volatile propellant used was a mixture of one part by weight of dichlorodifluoromethane to nine parts by weight of dichlorotetrafluoroethane.

The burn spray composition of this example was made up by blending the first three ingredients and the benzocaine with the oleaginous ointment base at room temperature. The propellant was then introduced and incorporated into the base mixture by stirring at room temperature in a pressure container. The resulting mixture was then filled into valved aerosol dispenser containers by a known conventional procedure. Finally, the filled containers were tested in the usual manner in a hot water bath at a temperature of about 130° F. After this test the dispenser containers were cooled and were ready for use.

The oleaginous base and the medicaments in the self-propelling fluid ointment composition are all dispersed in solution or suspension in the propellant at ordinary temperatures.

*Example 2*

|  | Percent |
|---|---|
| Thiomerosal | 0.001 |
| Dichlorophene | 0.100 |
| Tyrothricin | 0.015 |
| Oleaginous ointment base (includes 2.5% benzocaine) | 29.884 |
| Inert volatile propellant | 70.000 |

The propellant used in this example was a mixture of nine parts of dichlorodifluoromethane to one part by weight of trichloromonofluicromethane, the propellant being mixed with the ointment base to provide a solution which was filled into the valved dispensing containers by a conventional filling procedure. The filled dispenser containers were shaken and tested in hot water in the same manner as in Example 1.

*Example 3*

|  | Percent |
|---|---|
| Thiomerosal | 0.001 |
| Dichlorophene | 0.100 |
| Tyrothricin | 0.015 |
| Oleaginous ointment base (includes 2.5% benzocaine) | 9.884 |
| Inert volatile propellant gases | 90.000 |

The propellant gases used in this example were the same as those used in Example 1 and in the same ratio. The base ingredients and propellant were mixed and filled into valved dispensers by a conventional procedure, and the filled containers were then tested in the manner described under Example 1.

*Example 4*

|  | Percent |
|---|---|
| Neomycin | 0.0410 |
| Allantoin | 0.0250 |
| Hexachlorophene | 0.0375 |
| Tyrothricin | 0.0050 |
| Benzocaine | 1.5000 |
| Oleaginous ointment base | 10.0000 |
| Inert volatile propellant | 88.3915 |

The volatile propellant in this instance consisted of the same materials used in Example 1, i.e. "Freon" 12 and "Freon" 114, but in equal parts by weight.

Neomycin was used for its powerful bactericidal and antibiotic action, allantoin to promote skin granulation in burns and similar wounds, and hexachlorophene as a germicide.

*Example 5*

|  | Percent |
|---|---|
| Neomycin | 0.0250 |
| Intracaine | 0.2000 |
| Allantoin | 0.0250 |
| Hexachlorophene | 0.0375 |
| Tyrothricin | 0.0200 |
| Perfume | 0.0250 |
| Oleaginous ointment base | 9.8000 |
| Inert volatile propellant | 89.8675 |

The volatile propellant in this example was the same as that used in Example 4. Intracaine was included in the above composition as an anesthetic providing less sensitization to the skin than any other topical anesthetic available to the public.

*Example 6*

|  | Percent |
|---|---|
| Neomycin sulfate | 0.010 |
| Intracaine | 0.225 |
| Allantoin | 0.010 |
| Hexachlorophene | 0.020 |
| Tyrothricin | 0.001 |
| Perfume | 0.001 |
| Oleaginous ointment base | 4.275 |
| Inert volatile propellent | 95.458 |

The liquefied gaseous propellant of this composition and those used in succeeding examples consisted of "Freon" 22, $CHClF_2$, amounting to 10% of the composition, and "Freon" 114 $(CClF_2)_2$, making up the remainder of the propellant for the composition. While both are propellants the former is particularly effective as a solvent for the base and medicants and when applied does not cause stinging. The latter also acts as a solvent but primarily as a diluent and propellant.

*Example 7*

|  | Percent |
|---|---|
| Neomycin undecylenate | 0.010 |
| Intracaine | 0.225 |
| Allantoin | 0.010 |
| Hexachlorophene | 0.020 |
| Tyrothricin | 0.001 |
| Perfume | 0.001 |
| Oleaginous ointment base | 4.275 |
| Inert volatile propellant: |  |
| "Freon" 22 | 10.000 |
| "Freon" 114 | 85.458 |

*Example 8*

|  | Percent |
|---|---|
| Neomycin undecylenate | 0.01053 |
| Intracaine | 0.23688 |
| Allantoin | 0.01053 |
| Hexachlorophene | 0.02106 |
| Tyrothricin | 0.00105 |
| Perfume | 0.00105 |

| Oleaginous ointment base | 4.50000 |
|---|---|
| Inert volatile propellant: | |
| "Freon" 22 | 10.00000 |
| "Freon" 114 | 85.21890 |

The compositions of Examples 7 and 8 illustrate the preferred compositions according to the invention and have given unusual results in practice. Other compositions containing the same ingredients were prepared in which the proportions of polyethylene ointment base, the neomycin undecylenate and the other medicants were progressively reduced and increased from those of Example 8. In this series of (fourteen) compositions, including Example 8, the range of the polyethylene base was from 2 to 8.5% and that of neomycin undecylenate from 0.00468 to 0.01989%. The content of "Freon" 22 was the same in all compositions of the series while that of "Freon" 114 varied from 87.87514, with the 2% polyethylene base, to 80.96902% with the 8.5% polyethylene base.

The aerosol compositions of all of the examples have been used effectively in the treatment of burns and other wounds. For example, the aerosol composition of Example 6 was used in the treatment of 210 cases of burns varying from first degree burns to third degree body burns involving almost one half of the body. The spray was applied to the affected burn areas at 3 to 4 hour intervals. The anesthesia was excellent and the acceptance by children was very good. The results were excellent in this group of cases and were superior to any other known method of surface treatment of burns. Epithelialization was good and healing excellent. The pain was minimized and patients with severe burns were ambulated early with burned areas left open and easily inspected.

The aerosol composition of Example 6 was used in the treatment of 157 lesions involving the skin of the face, elbows, sacrum, buttocks, knees and ankles. The spray was applied twice a day with excellent results; epithelialization and healing were good; the wounds were healed with good cosmetic results and debris and necrotic areas cleared up rapidly.

In 20 cases of dermatitis the spray provided rapid relief from itching and burning and permitted healing of the excoriated area. Ten cases of diaper rash, 10 cases of "prickly heat," miliaria responded rapidly. In no cases in this entire series was any skin reaction to the medication in the spray noted.

In 17 cases of fistula, ilestomy or colostomy, the spray was used to coat the skin to prevent excoriation by the digestive fluids. The results in these cases were excellent.

No failure in therapy was found in the foregoing cases. In almost one-half of the cases the spray was used after failure by standard pastes or ointments. The formulation provided a superior method for the treatment of lesions of the skin where the continuity of the skin is disturbed.

Unusual and unexpected results were obtained with a first-aid aerosol spray containing neomycin undecylenate, the base containing the polyethylene and the other ingredients referred to in Example 7, in the treatment of burns and other conditions. Neomycin undecylenate has been found to adhere to skin lesions and remain for days, as a stable healing medicant which is a great advantage. In the use of the aerosol first-aid spray, it was applied to the affected moist skin surface, thereby providing effective contact between the skin lesion and the medication. The base remained in an emulsion liquid state and avoids a barrier between the lesion and the medication. Furthermore, the base allowed the passage of gases, vapor and serum so that the lesion could breath. The aerosol undecylenate medication was applied to both ambulatory and hospital patients by spraying on four times a day. The spray was used on 257 cases of burns, bruises, decubitus ulcers and varicose ulcers. It was also used in 15 cases of ordinary ringworm. The results were excellent. Cases with long standing dermatitis showed marked relief of itching and subsistence of secondary infection. The tyrothricin and hexachlorophene were included in the composition to consolidate anti-bacterial activity, the intracaine provided anesthesia for the burns and the allantoin was included to remove necrotic material that hinders healing.

The aerosol spray containing neomycin undecylenate according to Examples 7 and 8 was also used in the treatment of a large number of skin lesions of mixed bacterial and fungal infections with excellent results. In many of these cases there has been no response to neomycin sulfate or undecylenic acid alone. The virtue of the neomycin undecylenate was demonstrated in an outstanding way in the treatment of decubitus ulcers, varicose ulcers, severe dermaphytosis and infected lesions, in which the treatment gave excellent results.

The first-aid spray having the composition shown in Example 7 was used in 200 cases of severe athlete's foot after they had already proved refractory to potassium permanganate baths and various fungistatic agents on the market. The results in these 200 cases treated with the first-aid spray were superior to those obtained by any previous method of control.

The neomycin undecylenate is the neomycin salt of undecylenic acid. While this acid has been used as a 5% ointment in the treatment of fungus infections, its combination with neomycin gave unexpected results as noted above. The acid is a vile smelling compound having an odor suggestive of perspiration while the neomycin undecylenate is completely odorless.

Several advantages resulting from the application of the aerosol mixture in the foregoing cases were noted:

(1) The continuing contact of the medication with the healing surface. It was noted that the base remains semifluid and the medications are in suspension. The contact of the medications with the wound is continuously changing.

The fact that the base remains a gel of polyethylene in oil and does not change viscosity promotes the removal of foreign material such as gravel cloth or dead tissue and the organic elements are acted upon continuously by the allantoin. This produces excellent cosmetic results—less staining and fewer granules of gravel or foreign material in the excoriated area as it heals.

(2) The continued gel characteristics of the menstruum avoids removing early epithelial buds and islands as it happens when bandages are applied or heavy-based ointments are applied. This permits healing while the foreign material is being removed. The two processes can go on simultaneously.

(3) The film created by the gel of polyethylene "breathes" and is permeable. It has been shown that the formulation of the gel in big interlocking fibers of polyethylene permits the passage of fluids and vapors through it. This prevents collections of serum underneath which would provide a culture for bacterial and fungal growths. This is of particular value in the treatment of burns.

(4) Visibility of the wound is maintained throughout. The open method of therapy presents many advantages. Mobility resulting from the constant motion of the extremity, the freedom from pain and the avoidance of occlusive dressings which permit the collections of pus below scales and prevent rigid or contractile scars. The functional and cosmetic result is excellent as a result of this property. This makes the spray an excellent modality for use in cleaning up open areas for subsequent skin grafting. In addition the removal of secretions reduces scar or scab formation to a minimum.

The superior breathing characteristics of the aerosol sprayed ointment composition containing polyethylene was apparent from the medical test referred to above, but was also demonstrated in comparative tests. Those tests were conducted by providing test tubes containing water. The water in the test tubes was boiled to expel oxygen and an indicator, sodium resazurin was placed in the water in each test tube to indicate the oxygen transmitted to the water. The indicator was added to the water in the test tube before the oxygen was expelled, and each solution was colorless or a very light blue. This indicator turns a distinct pink when oxygen enters the water. The materials to be tested, including, for example, the aerosol ointment composition of Example 6 were sprayed onto the water layer. Other ointment compositions were also sprayed or otherwise applied to the surface of the water layer in separate test tubes and observations were made at regular intervals to determine the relative rate of oxygen transfer as evidenced by the color change in the indicator in the water layer of the test tubes. The color would appear first at the top of the water layer or interfaced with the particular ointment and fuse downwardly at a rate depending on the oxygen transferred through the particular ointment composition.

The relative rates of oxygen transfer in the comparative tests were in the following order:

(1) Control tube with no upper layer.
(2) Aerosol sprayed ointment base containing polyethylene.
(3) Aerosol sprayed isopropyl myristate base ointment.
(4) Aerosol sprayed Carbowax base ointment.
(5) Aerosol sprayed cetyl alcohol base ointment.
(6) Aerosol sprayed Vaspar (a mixture of Vaseline and paraffin used to maintain anaerobic conditions in bacterial cultures), no oxygen transfer.

The tests showed that the oxygen transfer through aerosol sprayed Plastibase ointment is definitely faster than the transfer through the other tested bases and is a characteristic not found in such other bases.

A further comparative test was made between aerosol sprayed ointment containing the polyethylene base and the same ointment when spread mechanically in a layer. This comparative test showed that the oxygen transfer by the aerosol sprayed ointment base was definitely faster than the oxygen transfer through the same ointment when spread mechanically in a layer.

Comparative medicant release rate tests according to standard diffusion and ingestion procedures were carried out between the aerosol composition of Example 6 and the same composition in which the polyethylene base was replaced by a Carbowax base. The results by the two different standard procedures showed that after 60 minutes 3 to 4 times as much intracaine was released from the sprayed composition containing the polyethylene base as that released from the sprayed composition containing the Carbowax base. The release of intracaine as determined in the tests is representative of medicant release and the release from the sprayed polyethylene base composition was 3 to 4 times as fast that that from the sprayed similar composition containing the Carbowax base.

The percentage of the polyethylene-containing oleaginous base in the composition is preferably approximately that given in Examples 7 and 8. From about 2% to 10% by weight is the preferred range of base content, from the standpoint of average use and economy. Higher contents up to 30% base may be used for severe burns with a minimum amount of spraying, but compositions containing 8.5% or 10% base are satisfactory for severe burns. The compositions including the medicant neomycin undecylenate are preferred as exemplified by Examples 7 and 8. They spray well and have been successfully used in mild and severe cases, as outlined above, with unexpectedly good results.

The presence of the polyethylene resin in the base provides a breathing film which permits access of air and oxygen to facilitate the healing of burns and other wounds. The polyethylene and propellant in the composition cooperate in such a way that the polyethylene filaments are interlaced in a loose dispersion over any burned or affected area when sprayed by the propellant. A much more porous and spongy structure is produced as a result of the propellant gas leaving the sprayed particles of the base, which occurs almost instantly.

Where the medicament to be included in the ointment composition is present in aqueous or alcoholic solutions, the polyethylene base should include ingredients to make it absorbent, as pointed out above. One of these ingredients is an emulsifying agent which should approximate 6% by weight of the base. This emulsifying agent may be glyceryl mono-oleate or its equivalent.

The gaseous propellants used in the composition are inert and vaporize almost instantly as the spray leaves the distributor valve of the dispenser. The propellants, as in the foregoing examples, comprise a component of low vapor pressure in which the medicants and base material may be dissolved, dispersed or suspended and a gaseous component of relatively higher vapor pressure functioning primarily to effect the spraying of the mixture, although it may also act as a solvent. The chlorine and fluorine substituted hydrocarbons of lower pressure as used in the foregoing examples are suitable for that purpose, while the other component of the propellant may comprise one or more of the following chlorine and fluorine substituted hydrocarbons:

Dichlorodifluoromethane
Trichlorotrifluoroethane
Monochlorodifluoromethene

Other chlorine and fluorine substituted hydrocarbons may be used, as well as propane, butane, pentane and their isomers, carbon dioxide and nitrous oxide. One or more of these gases may be used together, preferably in combination with a relatively low-pressure gaseous component, such as dichlorotetrafluoroethane or trichloromonofluoromethane, to give a vapor pressure of from 5 to 120 lbs. per square inch gauge. Any propellant mixture, however, must be inert and non-explosive. Furthermore, the propellant gases should be selected or mixed to provide for a minimum of skin irritation. The preferred combination of propellants from this standpoint and for disolving and spraying the components of the compositions are those used in Examples 6, 7 and 8.

While the mineral oil of the ointment base material is preferably petrolatum, it may be a heavy mineral oil having a Saybolt Universal viscosity at 38° C. of from 300 to 350 sec. The polyethylene used in the base mixture may have a molecular weight of from 3,500 to 25,000, but the preferred range for the molecular weight of the polyethylene is from 18,000 to 21,000.

In making up the propellant compositions for packaging or during packaging where the ointment base material comprises 10% or more of the composition, this is preferably premixed with one of the low pressure liquefied propellent gases which acts as a solvent, to form a solution or suspension, after which the higher pressure liquefied propellant gas is incorporated in the mixture. The ointment composition preferably comprises at least about 70% of propellant.

In general where the ointment composition is packed in glass or plastic bottles, the proportion of lower vapor pressure propellant is greater than the proportion of higher pressure propellent gas. For example, if the composition is comprised of 10% by weight of the ointment base and medicant ingredients, it may advantageously comprise 9% by weight of the propellant of higher vapor pressure, such as dichlorodifluoromethane and 81% by weight of the relatively low vapor pressure gas.

Where the ointment composition is packaged in metal containers, the proportions of the two gases may be reversed. For example, a self-propelling composition containing 10% by weight of the ointment base and medicant ingredients may comprise 81% by weight of the liquefied propellent gas of high vapor pressure, such as dichlorodifluoromethane, and 9% by weight of the relatively low vapor pressure liquefied gas.

The use of a mixture of relatively low pressure and relatively high pressure propellent gases for the ointment composition permits the compounding of a propellent mixture which may be safely packed in glass containers and effectively sprayed therefrom, or which may be packed in metal containers at much higher pressures. Furthermore, the mixture of propellent gases permits the application of the correct amount of ointment in a manner such that the effective ingredients of the ointment are held on the affected area of the skin by a lattice of polyethylene filaments which are loosely interlaced over each other as they are propelled onto the affected area by the propellant, thereby providing a breathing film which permits access of air to and accelerates the release of the medicant to the affected area.

I claim:

1. In a self-propelling fluid medicinal ointment composition for the treatment of body surface burns and other wounds, the composition being contained in and adapted to be atomized from a fluid-tight valved container directly onto the burns or other wounds, said medicinal ointment composition including a medicament, an ointment base and an inert liquified compressed gaseous propellant, the improvement in which the medicinal ointment composition comprises approximately 0.1% by weight of the medicament, from approximately 10% to approximately 30% by weight of the ointment base and the propellant constituting essentially the remainder of the composition and in which the medicament and ointment base are dispersed, said ointment base being composed of a heavy mineral oil containing polyethylene dispersed therein in the form of small crystallites surrounded by long filaments of amorphous polyethylene resin, said polyethylene having a molecular weight of at least 3,500 and comprising from approximately 0.25% to approximately 50% by weight of the ointment base, said medicinal ointment composition when sprayed from the container onto a burned or wounded area of the body surface by the propellant having the property of producing a non-running coating of the ointment base containing the medicament dispersed therein, said polyethylene content of the ointment base being deposited by the propellant in a loose dispersion of interlaced filaments forming a lattice of polyethylene filaments having a porous spongy structure holding the medicament on the burned or wounded area of the skin and permitting access of air and oxygen to the burned or wounded area of the skin, whereby healing of the burn or other wound is facilitated.

2. In a self-propelling fluid medicinal ointment composition for the treatment of body surface burns and other wounds, the composition being contained in and adapted to be atomized from a fluid-tight valved container directly onto the burns or other wounds, said medicinal ointment composition including a medicament, an ointment base and an inert liquified compressed gaseous propellant, the improvement in which the medicinal ointment composition comprises a minor but sufficient proportion of the medicament, from approximately 10% to approximately 90% by weight of the ointment base and the propellant constituting essentially the remainder of the composition and in which the medicament and ointment base are dispersed, said ointment base being composed of a heavy mineral oil containing polyethylene dispersed therein in the form of small crystallites surrounded by long filaments of amorphous polyethylene resin, said polyethylene having a molecular weight of from 3,500 to 25,000 and comprising approximately 5% by weight of the ointment base, said medicinal ointment composition when sprayed from the container onto a burned or wounded area of the body surface by the propellant having the property of producing a non-running porous coating of the ointment base containing the medicament dispersed therein, said sprayed propellant depositing the polyethylene content of the ointment base in a loose dispersion of interlaced filaments having a spongy structure holding the medicament on the burned or wounded area of the skin and forming a lattice of polyethylene filaments, whereby healing the burn or other wound is facilitated.

3. In the method of treating a burned or wounded area of the human body surface in which a composition comprising a medicament, an ointment base and a volatile propellant and contained in a fluid-tight valved container is atomized directly onto the burned or wounded area, the improvement comprising the steps of providing a medicinal ointment composition including a minor but sufficient proportion of a medicament for promoting the healing of the burned or wounded area, from approximately 10% to approximately 90% by weight of an ointment base and an inert liquified compressed gaseous propellant constituting essentially the remainder of the composition and in which the ointment base is composed of a heavy mineral oil containing polyethylene dispersed therein in the form of small crystallites surrounded by long filaments of amorphous polyethylene resin, said polyethylene having a molecular weight of from 3,500 to 25,000 and comprising approximately 5% by weight of the ointment base, spraying the medicinal ointment composition containing the polyethylene directly onto the burned or wounded area, the propellant and the polyethylene content of the ointment base cooperating to provide on the burned or wounded area a non-running porous coating of the ointment base containing the medicament dispersed therein, the propellant in being released from the container depositing the polyethylene content of the ointment base in a loose dispersion of interlaced filaments having a porous spongy structure holding the medicament on the burned or wounded area and forming a lattice of polyethylene filaments as a breathing film permitting access of air and oxygen to the burned or wounded area, whereby healing of the burn or wound is facilitated.

4. In a self-propelling fluid medicinal ointment composition for the treatment of body surface infections, burns and other wounds, the composition being contained in and adapted to be atomized from a fluid-tight valved container directly onto the burns or other wounds, said medicinal ointment composition including a medicament, an ointment base and an inert liquefied compressed gaseous propellant, the improvement in which the medicinal ointment composition comprises from approximately 0.01 to 0.02% by weight of neomycin undecylenate as the medicament, from approximately 2% to approximately 10% by weight of the ointment base and a volatile propellant constituting essentially the remainder of the compositon and in which the medicament and ointment base are dispersed, said ointment base being composed of a heavy mineral oil containing polyethylene dispersed therein in the form of small crystallites surrounded by long filaments of amorphous polyethylene resin, said polyethylene having a molecular weight of at least 3,500 and comprising from approximately 5.0% to approximately 50% by weight of the ointment base, said medicinal ointment composition when sprayed from the container onto an affected area of the body surface by the propellant having the property of producing a non-running coating of the ointment base containing the neomycin undecylenate dispersed therein, said polyethylene content of the ointment base being deposited by the propellant in a loose dispersion of interlaced filaments forming a lattice of polyethylene filaments having a porous spongy structure holding the neomycin undecylenate on the affected area of the skin and permitting its rapid release to and the access of air and oxygen to the affected area of the skin, whereby healing of the infection, burn or other wound is facilitated.

5. The ointment composition as claimed in claim 4, in which the propellant comprises monochlorodifluoromethane to the extent of approximately 10% of the composition, the remainder of the propellant being dichlorotetrafluoroethane.

6. A self-propelling fluid medicinal ointment composition for the treatment of body surface infections, burns and other wounds, the composition being contained in and adapted to be atomized from a fluid-tight valved container directly onto the burns or other wounds, said medicinal ointment composition comprising essentially the following ingredients in percent by weight:

| | |
|---|---|
| Neomycin undecylenate | 0.010 |
| Intracaine | 0.225 |
| Allantoin | 0.010 |
| Hexachlorophene | 0.020 |
| Tyrothricin | 0.001 |
| Perfume oil | 0.001 |
| Oleaginous ointment base | 4.500 |
| An inert liquefied compressed gaseous propellant | 96.233 | the oleaginous ointment base being composed of a heavy mineral oil containing polyethylene dispersed therein in the form of small crystallites surrounded by long filaments of amorphous polyethylene resin, said polyethylene have a molecular weight of at least 3,500 and comprising from approximately 5.0% to approximately 50% by weight of the ointment base, said medicinal ointment composition when sprayed from the container onto an affected area of the body surface by the propellant having the property of producing a non-running coating of the ointment base containing the medicaments dispersed therein, said polyethylene content of the ointment base being deposited by the propellant in a loose dispersion of interlaced filaments forming a lattice of polyethylene filaments having a porous spongy structure holding the medicaments on the affected area of the skin and permitting access of air and oxygen to the affected area of the skin, whereby healing of the infection, burn or other wound is facilitated.

7. The ointment composition as claimed in claim 6, in which the volatile propellant comprises monochlorodifluoromethane to the extent of about 10% of the composition, the remainder of the propellant being dichlorotetrafluoroethane.

8. In the method of treating a fungus infected, burned or wounded area of the human body surface in which a composition comprising a medicament, an ointment base and an inert liquified compressed gaseous propellent and contained in a fluid-tight-valved container is atomized directly onto the infected, burned or wounded area, the improvement comprising the steps of providing a medicinal ointment composition including a minor but sufficient proportion of neomycin undecylenate as a medicament for promoting the healing of the infected, burned or wounded area, from approximately 2% to approximately 10% by weight of an ointment base and the propellant constituting essentially the remainder of the composition and in which the ointment base is composed of a heavy mineral oil containing polyethylene dispersed therein in the form of small crystallites surrounded by long filaments of amorphous polyethylene resin, said polyethylene having a molecular weight of from 3,500 to 25,000 and comprising from approximately 5% to 25% by weight of the ointment base, spraying the medicinal ointment composition containing the polyethylene directly onto the infected, burned or wounded area, the propellant and the polyethylene content of the ointment base cooperating to provide on the infected, burned or wounded area a non-running porous coating of the ointment base containing the neomycin undecylenate dispersed therein, the propellant in being released from the container depositing the polyethylene content of the ointment base in a loose dispersion of interlaced filaments having a porous spongy structure holding the neomycin undecylenate on the infected, burned or wounded area and forming as a breathing film a lattice of polyethylene filaments permitting rapid release of the neomycin undecylenate and access of air and oxygen to the infected, burned or wounded area, whereby healing is facilitated.

References Cited in the file of this patent

UNITED STATES PATENTS

| | | |
|---|---|---|
| 2,580,654 | Browning | Jan. 1, 1952 |
| 2,628,187 | Frohmader | Feb. 10, 1953 |
| 2,742,321 | Mina et al. | Apr. 17, 1956 |
| 2,782,975 | Bird | Feb. 26, 1957 |
| 2,801,201 | Kipnis | July 30, 1957 |
| 2,830,011 | Parker et al. | Apr. 8, 1958 |
| 2,902,376 | Beacher et al. | Sept. 1, 1959 |
| 2,953,284 | Prussin et al. | Sept. 20, 1960 |
| 2,968,628 | Reed | Jan. 17, 1961 |
| 2,989,437 | Wruble et al. | June 20, 1961 |
| 2,995,278 | Clapp | Aug. 8, 1961 |
| 3,014,844 | Thiel et al. | Dec. 26, 1961 |

OTHER REFERENCES

Mutimer et al.: J.A.P.A., Sci. Ed., vol. 45, No. 2, February 1956, pp. 101–105.

Downing et al.: Soap and Sanitary Chemicals, September 1953, vol. 29, No. 9, pp. 142, 143, 145, 147, 149, 153, 155, 177 and 178.

Lesser: Drug and Cosmetic Industry, 68: 6, June 1951, pp. 732–733, 812–817 esp. page 733.

PDR, Hexathricin Aerospra, Physician's Desk Reference, Medical Economics, Oradell, N.J. (1959); p. 719.

Mutimer et al.: J.A.P.A., Sci. Ed., vol. 45, No. 4, April 1956, pp. 212–218.

Mecca: Drug and Cosmetic Industry, 76: 6, June 1955, pp. 768–9 and 867–72.

Livingood et al.: J.A.M.A., 148: 5, Feb. 22, 1952, pp. 334–339.